W. L. R. EMMET.
SHAFT PACKING.
APPLICATION FILED NOV. 25, 1907.
924,897.
Patented June 15, 1909.
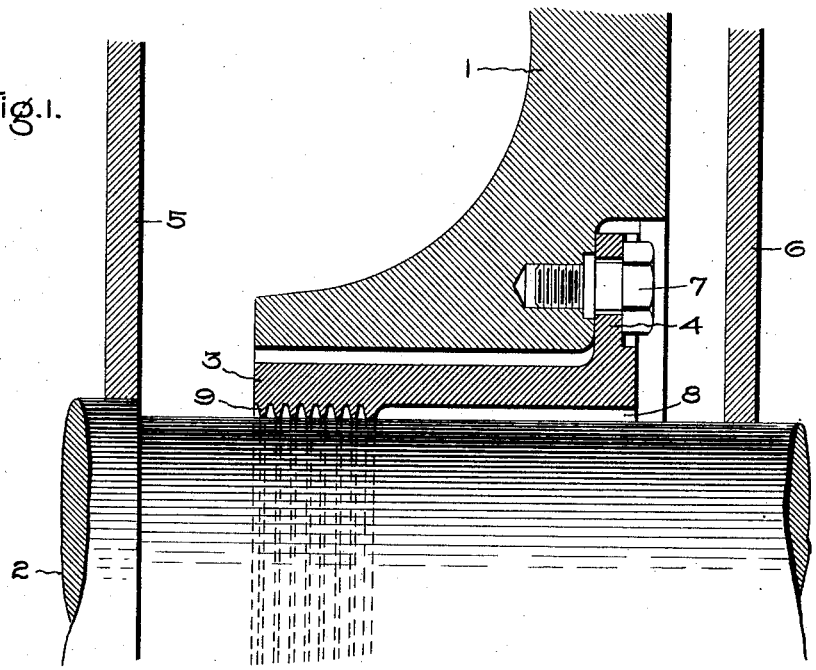
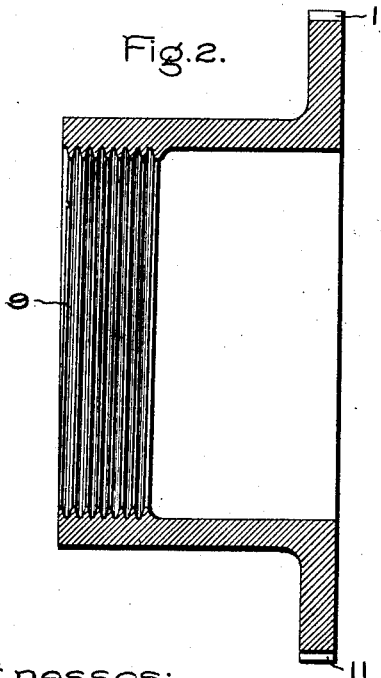
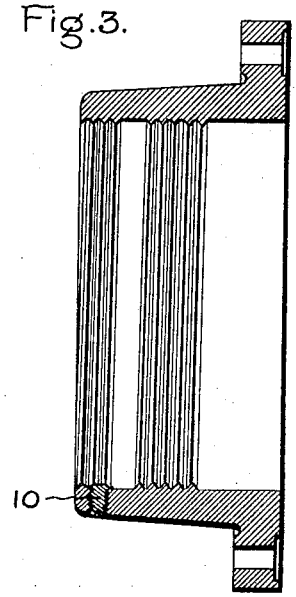
Witnesses:
Marcus L. Byng.
J. Ellis Glen.
Inventor:
William L. R. Emmet,
by Albert G. Davis
Att'y.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SHAFT-PACKING.

No. 924,897.      Specification of Letters Patent.      Patented June 15, 1909.

Application filed November 25, 1907. Serial No. 403,610.

*To all whom it may concern:*

Be it known that I, WILLIAM L. R. EMMET, a citizen of the United States, residing at Schenectady, county of Schenectady, State of New York, have invented certain new and useful Improvements in Shaft-Packings, of which the following is a specification.

The present invention relates to shaft packings for turbines, which surround the main shaft and restrict the passage of steam or other elastic fluid from one side of a diaphragm or partition to the other in a multistage machine. Great difficulty has been experienced in getting a suitable packing for this purpose, and especially in turbines employed for marine propulsion, which have many stages and long shafts. Stated generally, the packings have either had such small clearances that they seized the shaft when the parts were heated or distorted due to any cause or else they permitted an excessive amount of motive fluid to escape from one stage to another. Owing to the fact that these packings are inclosed, it is impossible to determine what the clearance is after use without taking down the machine, and a packing that was right at the start might after a short run be so distorted as to rub on the shaft and cause damage to the machine or result in excessive heating and injury to the shaft, or might unduly increase the clearance through which motive fluid could pass.

My invention has for its object to provide a packing of improved construction which is free from the objections above noted, and which will effectively prevent the free passage of motive fluid from one stage to the next.

In the accompanying drawing, which illustrates embodiments of my invention, Figure 1 shows one of the diaphragms of a multistage turbine of the Curtis type with the packing mounted in place between two wheels, and Figs. 2 and 3 show sections of slight modifications of the packing sleeve.

1 indicates a diaphragm, usually made of cast iron or steel, whose opposite sides are subjected to different pressures. It is bored centrally to receive the shaft 2, made of forged steel, and the packing-sleeve 3, the latter being made of a suitable metal such as cast iron, or a composition, as, for example, of copper, zinc and a small amount of lead. I find it desirable, when cast iron diaphragms are used in vertical shaft machines, to employ cast iron packing sleeves, because the ratio of expansion and contraction of the parts will be the same. In horizontal shaft machines, where the rusting of the parts is more of a factor, the packing-sleeve can be made of a non-rusting composition. The diaphragm is or may be recessed or shouldered to receive a flange 4 formed integral with one end of the annular packing-sleeve. 5 and 6 indicate bucket-wheels mounted on the main shaft on opposite sides of the diaphragm.

The flange of the packing-sleeve extends perpendicular to the axis of the shaft and rests on the shoulder on the diaphragm. The cylindrical part of the sleeve is fairly long, and is unyielding with respect to the flange so that after once being set in position it remains fixed. Extending through the flange is a number of axially extending and firmly seated stud bolts 7, which rigidly clamp the packing-sleeve and prevent it from moving bodily in a plane perpendicular to the shaft or around with it after the nuts are seated. Around the portion of each bolt extending through the flange is a space sufficient to permit of the sleeve being accurately centered around the shaft before the nuts are screwed into place. The cylindrical part of the sleeve extends parallel to the shaft and is separated from the bore of the diaphragm by a substantial space, so that it can expand outwardly in case the shaft rubs. As before pointed out, the flange is rigidly clamped in place; and to prevent the wall of the bore of the sleeve from engaging the shaft when heated by expanding inwardly, or the shaft from rubbing it if it is suddenly sprung to one side by a change in operating conditions, I cut away the metal as shown at 8, leaving a large annular space whose length is many times greater than its radial depth. The radial depth of this space is made great enough so that, no matter how much the shaft and packing-sleeve expand, distort or change in position, they cannot rub at this point. The opposite or free end of the sleeve is provided with a series of internal projections 9 with spaces between. The projections can with advantage be made in the form of a screw-thread of fairly coarse pitch, as in Fig. 2, with a plug 10, Fig. 3, or equivalent device to prevent the motive fluid from freely following the spiral groove between the threads from the region of high pressure to that of low. They can also be arranged in parallel planes, as shown in Fig. 1. The faces of the threads or projections presented to the shaft are made relatively small measured axially, so that in event of their engaging with the shaft they will be worn down by an amount necessary to permit the shaft to freely turn. By internally screwthreading the end of the sleeve, instead of making projections occupying planes perpendicular to the axis, any wear on the shaft will be well distributed instead of forming parallel grooves therein. The clearance between the teeth or projections and the shaft is made as small as possible consistent with the service to be performed, while the space surrounding the free end of the sleeve, and between it and the wall of the bore in the diaphragm, is made large enough to permit of any expansion or distortion of the sleeve at this point. On the periphery of the flange are lugs 11 that serve to center the sleeve and support the weight of the diaphragm when used in a horizontal machine and the parts are being assembled. Or these lugs may enter slots formed in the diaphragm or engage projections thereon to prevent the sleeve from turning and thus prevent any shearing strain on the bolts. Instead of making the thread continuous, it may be made in short sections, as shown in Fig. 3. I have formed such an arrangement in practice to effectively prevent the free passage of steam. Experience shows that a sleeve having a screw-thread of about four turns per inch will operate satisfactorily.

It will be observed that the part of the sleeve having the most metal and where it is clamped to its support is free to expand and contract toward and away from the axis with temperature changes without interfering with the shaft, while the free end or part that actually prevents the passage of motive fluid is separated from the shaft by a small clearance, is free to expand outwardly, and has a surface of limited area that may be worn off more or less in event of the parts rubbing. It is also to be noted that the free end of the sleeve is not backed up by the metal of the diaphragm, and that the opposite end, which is fixed, is cut away or relieved with respect to the shaft, so that if a sudden change in load moves the shaft to one side it can only touch the points of the screw-thread or projections, and since the surface area presented is very small they will quickly be worn down and the shaft will again run free.

The clearance diameters may vary in different stages of the machine. For example, in a seven-stage machine the clearances hot may progressively increase toward the low-pressure end from .05" to .20", the same clearance diameters cold varying from .013" to .19" These figures are given as illustrations, and not as necessary limitations to show how carefully the parts must be constructed, and what small clearances are considered as desirable. Actual practice has demonstrated that such a packing is free from the objections commonly found in stage packings, is simple in construction and reliable in operation.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is,—

1. In an elastic-fluid turbine, the combination of a bored partition which is subjected to different pressures on opposite sides, a shaft extending through the bore, and a packing-sleeve which is rigidly attached to the partition at one end only and is separated from the shaft by a small radial clearance at the free end, the said free end being free to expand outwardly while the attached end is separated from the shaft by a larger clearance and is free to expand inwardly without engaging the shaft.

2. In an elastic-fluid turbine, the combination of a bored partition which is subjected to different pressures on opposite sides, a shaft extending through the bore, a flanged sleeve that surrounds the shaft and is anchored by the flange to the partition at one end only, is separated from the shaft adjacent the plane of the flange by a large clearance and from the shaft at the free end by a small radial clearance which limits the passage of motive fluid, the said free end having internal grooves and projections which cooperate with the adjacent cylindrical surface of the shaft.

3. In combination, a bored partition which is subjected to different pressures on opposite sides, a shaft extending through the bore, a packing-sleeve that is located in the bore and surrounds the shaft, a flange on one end of the sleeve, which is seated on the partition, bolts for rigidly attaching the flange to the partition, the attached end of said sleeve being separated from the shaft by a large clearance, while the free end is separated from the shaft by a small clearance, and from the bore of the partition by a large clearance, projections on the free end of the sleeve, which form a screw-thread, and means for preventing the free flow of fluid through the groove between the threads.

4. In an elastic-fluid turbine, the combination of a bored partition which is subjected to different pressures on opposite sides, a rigid packing-sleeve comprising a cylindrical portion and a flange perpendicular thereto, the said cylindrical portion being materially smaller in diameter than the bore of the partition, the bore of said sleeve having a portion at its free end which incloses the shaft with a small clearance and a portion at the opposite and attached end which incloses the shaft with a large clearance, projections on the free end only of the sleeve, that are separated by grooves, and bolts that pass through the flange into the partition for holding the sleeve in place.

5. In an elastic-fluid turbine, the combination of a bored partition subjected to different pressures on opposite sides, a shaft, a sleeve surrounding the shaft and located in the bore and separated therefrom by a space, a means for securing the sleeve to the partition at one end only, an internal screw-thread at one end of the sleeve with the points of the teeth in close proximity to the shaft, the opposite end of the bore of the sleeve being cut away or relieved with respect to the shaft, and a means for interrupting the continuity of the groove between said screw-threads.

6. In an elastic-fluid turbine, the combination of a bored partition subjected to different pressures on opposite sides, a shaft extending through the bore, a sleeve located in the bore and surrounding the shaft, which is anchored at one end only, a portion of reduced diameter on the free end of the sleeve, the said sleeve being relieved externally at its free end from the wall of the diaphragm bore and relieved internally from the shaft at its anchored end, the relief in both cases being greater than the clearance space between the portion of reduced diameter and the shaft.

7. In an elastic fluid turbine, the combination of a bored partition which is subjected to different pressures on its opposite sides, a packing sleeve having a rigid support on the portion of the partition adjacent its bore, a shaft which passes through the sleeve from one side of the partition to the other, the sleeve having a portion connected at one end with said support and extending longitudinally of the shaft, which portion is provided at its outer end with a plurality of spaced internal projections which are separated from the shaft by a small radial clearance, the interior of the remainder of said longitudinal portion being separated from the shaft by a greater clearance, and an annular space being provided about the periphery of said longitudinal portion to permit freedom of expansion.

8. In an elastic fluid turbine, the combination of a bored partition which is subjected to different pressures on its opposite sides, a packing sleeve having a rigid support on the portion of the partition adjacent its bore, a shaft extending through the sleeve from one side of the partition to the other, said sleeve having a longitudinal portion connected at one end with said support and separated from the shaft by a small radial clearance at its other end, said end being free to expand outwardly while the remainder of said longitudinal portion is separated from the shaft by a larger clearance and is free to expand inwardly without engaging the shaft.

In witness whereof, I have hereunto set my hand this 23rd day of November, 1907.

WILLIAM L. R. EMMET.

Witnesses:
BENJAMIN B. HULL,
HELEN ORFORD.